United States Patent
Kennedy et al.

(10) Patent No.: US 10,239,571 B2
(45) Date of Patent: Mar. 26, 2019

(54) OFF-HIGHWAY RECREATIONAL VEHICLE

(71) Applicant: Arctic Cat Inc., St. Cloud, MN (US)

(72) Inventors: Craig R. Kennedy, Ham Lake, MN (US); Ryan J. Hughes, Thief River Falls, MN (US); Adam Eric Kuiken, Warren, MN (US)

(73) Assignee: ARCTIC CAT INC., St. Cloud, MN (US)

( * ) Notice: Subject to any disclaimer, the term of this patent is extended or adjusted under 35 U.S.C. 154(b) by 0 days.

(21) Appl. No.: 15/905,321

(22) Filed: Feb. 26, 2018

(65) Prior Publication Data

US 2018/0178866 A1 Jun. 28, 2018

Related U.S. Application Data

(60) Continuation of application No. 15/684,863, filed on Aug. 23, 2017, which is a continuation of application
(Continued)

(51) Int. Cl.
*B62D 63/02* (2006.01)
*B60K 5/00* (2006.01)
(Continued)

(52) U.S. Cl.
CPC ............ *B62D 63/02* (2013.01); *B60G 3/00* (2013.01); *B60G 13/00* (2013.01); *B60J 5/0487* (2013.01); *B60K 5/00* (2013.01); *B60K 5/04* (2013.01); *B60K 5/1208* (2013.01); *B60K 13/02* (2013.01); *B60K 15/03* (2013.01); *B60K 15/063* (2013.01);
(Continued)

(58) Field of Classification Search
CPC ...... B62D 63/02; B62D 23/005; B62D 25/00; B62D 25/20; B62D 33/0625; B62D 65/10; B60G 3/00; B60G 13/00; B60J 5/0487; B60K 5/00; B60K 5/04; B60K 5/1208; B60K 13/02; B60K 15/03; B60K 15/063;
(Continued)

(56) References Cited

U.S. PATENT DOCUMENTS 1,976,071 A 10/1934 Hoffman
1,989,837 A 2/1935 Walters
(Continued)

FOREIGN PATENT DOCUMENTS

JP 62085705 A 4/1987

OTHER PUBLICATIONS

Prowler XT: 2006 Service Manual, Arctic Cat Inc., Dec. 2005, 202 pages.
(Continued)

*Primary Examiner* — John D Walters
(74) *Attorney, Agent, or Firm* — Lowe Graham Jones PLLC

(57) ABSTRACT

A vehicle configuration wherein the center of mass of the vehicle is approximately superimposed upon the passenger and driver centers of mass when seated within the vehicle. An occupant's center of mass can be approximated using a standard center of mass position approximation, or a combination of any number of standard center of mass position approximations. The vehicle's center of mass can be approximately superimposed upon the occupant's center of mass in at least the longitudinal and vertical directions.

17 Claims, 2 Drawing Sheets

Related U.S. Application Data

No. 15/143,353, filed on Apr. 29, 2016, now Pat. No. 9,771,112, which is a division of application No. 13/775,133, filed on Feb. 23, 2013, now Pat. No. 9,327,587, which is a continuation-in-part of application No. 13/485,696, filed on May 31, 2012, now Pat. No. 9,180,801.

(51) Int. Cl.

| | | |
|---|---|---|
| *B62D 65/10* | (2006.01) | |
| *B60J 5/04* | (2006.01) | |
| *B62D 23/00* | (2006.01) | |
| *B62D 25/00* | (2006.01) | |
| *B62D 25/20* | (2006.01) | |
| *B62D 33/06* | (2006.01) | |
| *B60K 15/063* | (2006.01) | |
| *B60K 13/02* | (2006.01) | |
| *B60G 3/00* | (2006.01) | |
| *B60G 13/00* | (2006.01) | |
| *B60K 5/04* | (2006.01) | |
| *B60K 5/12* | (2006.01) | |
| *B60K 15/03* | (2006.01) | |
| *B60K 17/08* | (2006.01) | |
| *B60K 17/34* | (2006.01) | |
| *B60N 2/01* | (2006.01) | |
| *B60N 2/24* | (2006.01) | |
| *B60R 21/13* | (2006.01) | |
| *B60K 11/06* | (2006.01) | |
| *B60R 21/00* | (2006.01) | |
| *B62D 21/18* | (2006.01) | |

(52) U.S. Cl.
CPC .............. *B60K 17/08* (2013.01); *B60K 17/34* (2013.01); *B60N 2/01* (2013.01); *B60N 2/24* (2013.01); *B60R 21/13* (2013.01); *B62D 23/005* (2013.01); *B62D 25/00* (2013.01); *B62D 25/20* (2013.01); *B62D 33/0625* (2013.01); *B62D 65/10* (2013.01); *B60G 2200/144* (2013.01); *B60G 2300/124* (2013.01); *B60G 2300/13* (2013.01); *B60K 11/06* (2013.01); *B60K 2005/003* (2013.01); *B60K 2015/0632* (2013.01); *B60K 2015/0633* (2013.01); *B60K 2015/0638* (2013.01); *B60R 2021/0018* (2013.01); *B60R 2021/0032* (2013.01); *B60R 2021/0097* (2013.01); *B60Y 2200/124* (2013.01); *B60Y 2200/20* (2013.01); *B60Y 2400/72* (2013.01); *B62D 21/183* (2013.01); *Y10T 29/49622* (2015.01)

(58) Field of Classification Search
CPC .......... B60K 17/08; B60K 17/34; B60N 2/01; B60N 2/24; B60R 21/13
USPC ........................................ 180/292
See application file for complete search history.

(56) References Cited

U.S. PATENT DOCUMENTS

| | | |
|---|---|---|
| 2,033,731 A | 3/1936 | Nallinger |
| 2,145,545 A | 1/1939 | Johnson et al. |
| 2,746,766 A | 5/1956 | Nallinger |
| 3,193,302 A | 7/1965 | Hill |
| 3,292,944 A | 12/1966 | Dangauthier |
| 3,292,945 A | 12/1966 | Dangauthier |
| 3,294,191 A | 12/1966 | Cauvin |
| 3,366,411 A | 1/1968 | Vittone |
| 3,407,893 A | 10/1968 | Hill |
| 3,448,994 A | 6/1969 | King et al. |
| 3,709,314 A | 1/1973 | Hickey |
| 4,029,338 A | 6/1977 | Headley |
| 4,641,854 A | 2/1987 | Masuda et al. |
| 4,681,178 A | 7/1987 | Brown |
| 4,693,134 A | 9/1987 | Kraus |
| 4,697,665 A | 10/1987 | Eastman et al. |
| 4,712,629 A | 12/1987 | Takahashi et al. |
| 4,798,400 A | 1/1989 | Kosuge |
| 4,805,720 A | 2/1989 | Clenet |
| 4,815,755 A | 3/1989 | Takata et al. |
| 4,817,985 A | 4/1989 | Enokimoto et al. |
| 5,251,713 A | 10/1993 | Enokimoto |
| 5,327,989 A | 7/1994 | Furuhashi |
| 5,579,858 A | 12/1996 | Petersen et al. |
| 5,954,364 A | 9/1999 | Nechushtan |
| 6,149,540 A | 11/2000 | Johnson et al. |
| 6,182,784 B1 | 2/2001 | Pestotnik |
| 7,270,336 B2 | 10/2007 | Fujimori |
| 7,287,619 B2 | 10/2007 | Tanaka et al. |
| D555,036 S | 11/2007 | Eck |
| 7,377,342 B2 | 5/2008 | Miyazaki et al. |
| 7,427,248 B2 | 9/2008 | Chonan |
| 7,438,147 B2 | 10/2008 | Kato et al. |
| 7,461,864 B2 | 12/2008 | Ervin |
| 7,506,712 B2 | 3/2009 | Kato et al. |
| 7,658,258 B2 | 2/2010 | Denney |
| 7,690,472 B2 | 4/2010 | Kato et al. |
| 7,708,103 B2 | 5/2010 | Okuyama et al. |
| 7,753,427 B2 | 7/2010 | Yamamura et al. |
| 7,753,980 B2 | 7/2010 | Kobayashi et al. |
| 7,819,220 B2 | 10/2010 | Sunsdahl et al. |
| 7,845,452 B2 | 12/2010 | Bennett et al. |
| 7,896,421 B2 | 3/2011 | Kosuge et al. |
| 7,938,481 B2 | 5/2011 | Kobayashi et al. |
| 8,037,959 B2 | 10/2011 | Yamamura et al. |
| 8,075,007 B2 | 12/2011 | Brady et al. |
| 8,132,827 B2 | 3/2012 | Bergman et al. |
| 8,157,039 B2 | 4/2012 | Melvin et al. |
| D665,305 S | 8/2012 | Eck |
| 8,382,125 B2 | 2/2013 | Sunsdahl et al. |
| 8,596,405 B2 | 12/2013 | Sunsdahl et al. |
| 8,613,335 B2 | 12/2013 | Deckard et al. |
| 8,613,336 B2 | 12/2013 | Deckard et al. |
| 8,640,814 B2 | 2/2014 | Deckard et al. |
| 8,746,719 B2 * | 6/2014 | Safranski ................. B60G 3/14 280/124.148 |
| 8,827,028 B2 | 9/2014 | Sunsdahl et al. |
| 8,944,449 B2 | 2/2015 | Hurd et al. |
| 2004/0195034 A1 | 10/2004 | Kato et al. |
| 2004/0195797 A1 | 10/2004 | Nash |
| 2004/0206568 A1 | 10/2004 | Davis et al. |
| 2004/0217568 A1 | 11/2004 | Gradu |
| 2005/0247506 A1* | 11/2005 | Rondeau ................. B62D 33/02 180/312 |
| 2006/0144631 A1 | 7/2006 | Kim |
| 2006/0270503 A1 | 11/2006 | Suzuki |
| 2007/0000715 A1 | 1/2007 | Denney |
| 2007/0069494 A1 | 3/2007 | Kinjyo et al. |
| 2008/0023240 A1 | 1/2008 | Sunsdahl et al. |
| 2008/0023249 A1 | 1/2008 | Sunsdahl |
| 2008/0283326 A1 | 11/2008 | Bennett et al. |
| 2009/0302590 A1 | 12/2009 | Van Bronkhorst et al. |
| 2010/0012412 A1 | 1/2010 | Deckard et al. |
| 2010/0019539 A1* | 1/2010 | Nakamura ........... B62D 21/186 296/190.04 |
| 2011/0240393 A1 | 10/2011 | Hurd et al. |
| 2012/0031688 A1 | 2/2012 | Safranski et al. |
| 2012/0085588 A1 | 4/2012 | Kinsman et al. |
| 2012/0152637 A1 | 6/2012 | Hapka |
| 2012/0217078 A1 | 8/2012 | Kinsman et al. |
| 2012/0223500 A1 | 9/2012 | Kinsman et al. |
| 2013/0161109 A1 | 6/2013 | Sunsdahl et al. |
| 2014/0090918 A1 | 4/2014 | Sunsdahl et al. |
| 2014/0124279 A1 | 5/2014 | Schlangen et al. |

(56) References Cited

U.S. PATENT DOCUMENTS

2014/0187366 A1    7/2014   Kouma et al.
2014/0187372 A1    7/2014   Kouma et al.

OTHER PUBLICATIONS

Rc-trucks.org [online], "Honda Odyssey: Is it a Family Van or a Screaming Off Road Vehicle?" Publicly available on Mar. 26, 2006, Retrieved from Internet: URL <http://www.rc-trucks.org/honda-odyssey.htm>. 5 pages.
Redline Revolt Service Manual, Redline Performance Products, LLC, 2008, 259 pages.
RedlinePerforms.com [online], "Redline Redefine, Specs: Revolt XL, Riot Side x Side" Publicly available before Jun. 28, 2010, [retrieved on Jun. 28, 2010]. Retrieved from the Internet: URL <http://www.buggyworkssandrails.com/images/102_0657.JPG>. 9 pages.
Reimpell et al., Engineering Principles: The Automotive Chassis, 2nd Ed., Butterworth-Heinemann on behalf of Society of Automotive Engineers, Inc, 2001, p. 346-347; 5 pages submitted.
RidgeRunner.biz [online], "A New Way to Have Fun Smoothing out the trial," Retrieved from Internet Archive Wayback machine, from Apr. 9, 2004: URL <http://ridgerunner.biz>, 1 page.
RidgeRunner.biz/home [online], "Let's start with a basic premise," Retrieved from Internet Archive Wayback machine, from Jun. 5, 2004: URL <http://ridgerunner.biz/home.htm>. 1 page.
RidgeRunner.biz/home [online], "Why Even Consider Buying a Two-Seat Ridge Runner?" Retrieved from Internet Archive Wayback machine, from Sep. 2, 2004: URL <http://ridgerunner.biz/home.htm.>. 1 page.
Robson, Rally Giants: Peugeot 205 T16, Velcoe Publishing, 2007, 129 pages.
Rolland, "Dueling Duners," Sand Sports, Jan./Feb. 2008, 8 pages.
Shepherd et al., The Development of a High-Performance Snowmobile Variable Speed Belt, SAE Technical Paper Series, Society of Automotive Engineers, 1996, 6 pages.
Shiells, Technical Report ARBRL-TR-02054: A Combinatorial Geometry Computer Description of the XR311 Vehicle, U.S. Army Armament Research and Development Command, Apr. 1978, 60 pages.
ShopYamaha.com [online], "Yamaha Parts Catalog," [retrieved May 19, 2017]. Retrieved from Internet: URL <https://www.shopyamaha.com/parts-catalog/parts/side-x-sides>. 5 pages.
Thornton, Sporting Peugeot 205s, Motor Racing Publications Ltd., 1997, 128 pages.
Wagstaff, Owner's Workshop Manual: McLaren M23 1973 onwards (all marks), Haynes Publishing, Jun. 2013, 168 pages.
War Department Technical Manual TM E9-803, German Volkswagen, U.S. War Department, Jun. 6, 1944, 144 pages.
Weber, "Anti-sway bars turn for the better," Chicago Tribune, Jan. 7, 2002, 6 pages, retrieved from chicagotribune.com on Jun. 8, 2015.
Yamaha Grizzly YFM600FWAM(C) Owner's Manual, Yamaha Motor Co., U.S.A., Apr. 1999, 164 pages.
Yamaha Rhino 660 YXR660FAS Owner's Manual, Yamaha Motor Co., Ltd., 2003, 154 pages.
Decision Declining to Institute Inter Partes Review of U.S. Pat. No. 8,944,449, Case IPR2017-00199, dated Apr. 17, 2017, 12 pages.
Decision Institution of Inter Partes Review of U.S. Pat. No. 8,746,719, Case IPR2015-01788, dated Feb. 4, 2015, 18 pages.
Decision Institution of Inter Partes Review of U.S. Pat. No. 8,596,405, Case IPR2014-01427, dated Feb. 13, 2015, 16 pages.
Decision Institution of Inter Partes Review of U.S. Pat. No. 8,596,405, Case IPR2014-01428, dated Feb. 13, 2015, 29 pages.
Decision Institution of Inter Partes Review of U.S. Pat. No. 8,827,028, Case IPR2015-01781, dated Feb. 3, 2016, 34 pages.
Decision Institution of Inter Partes Review of U.S. Pat. No. 8,827,028, Case IPR2015-01783, dated Feb. 3, 2016, 22 pages.
Decision Institution of Inter Partes Review of U.S. Pat. No. 8,746,719, Case IPR2015-01789, dated Feb. 4, 2016, 22 pages.
Final Written Decision, U.S. Pat. No. 8,596,405, Case IPR2014-01428, dated Feb. 4, 2016, 18 pages.
Final Written Decision, U.S. Pat. No. 8,596,405, Case IPR2014-01427, dated Feb. 4, 2016, 40 pages.
Final Written Decision, U.S. Pat. No. 8,746,719, Case IPR2015-01789, dated Feb. 1, 2017, 65 pages.
Final Written Decision, U.S. Pat. No. 8,746,719, Case IPR2015-01788, dated Feb. 1, 2017, 75 pages.
Final Written Decision, U.S. Pat. No. 8,827,028, Case IPR2015-01781, dated Jan. 30, 2017, 64 pages.
Final Written Decision, U.S. Pat. No. 8,827,028, Case IPR2015-01783, dated Jan. 30, 2017, 48 pages.
Petition for Inter Partes Review of U.S. Pat. No. 8,596,405, dated Aug. 29, 2014, 58 pages.
Petition for Inter Partes of U.S. Pat. No. 8,596,405, dated Aug. 29, 2014, 55 pages.
Petition for Inter Partes of U.S. Pat. No. 8,746,719, dated Aug. 21, 2015, 65 pages.
Petition for Inter Partes of U.S. Pat. No. 8,827,028, dated Aug. 20, 2015, 68 pages.
Petition for Inter Partes of U.S. Pat. No. 8,827,028, dated Aug. 20, 2015, 56 pages.
Petition for Inter Partes of U.S. Pat. No. 8,944,449, dated Nov. 7, 2016, 91 pages.
Petition for Inter Partes of U.S. Pat. No. 9,217,501, dated Dec. 8, 2016, 117 pages.
Petition for Inter Partes of U.S. Pat. No. 9,217,501, dated Dec. 9, 2016, 132 pages.
2011 Operator's Guide, Commander 800R/1000, Can-am, 2011, 149 pages.
Petition for Inter Partes of U.S. Pat. No. 9,217,501, Case IPR2017-00455, Decision: Denying Insititution of Inter Partes Review, dated Jul. 5, 2017, 20 pages.
Petition for Inter Partes of U.S. Pat. No. 9,217,501, Case IPR2017-00433, Decision: Institution of Inter Partes Review, dated Jul. 5, 2017, 32 pages.
Letter from Michael J. McKeen to Eric Serverson regarding U.S. Appl. No. 14/565,193, dated Apr. 6, 2016, 16 pages.
Arcticcatpartshouse.com [online], "2006 Arctic Cat Prowler XT 650 H1 Automatic 4x4 Cat Green (U2006P2S4BUSZ) Decals," [Retrieved on May 19, 2017]: URL <http://www.arcticcatpartshouse.com/oemparts/a/arc/54f47e6687a865190000e26f/decals>. 2 pages.
Heydinger, Gary; Vehicle Characteristics Measurements of Recreational Off-Highway Vehicles; Report; Apr. 2011; 498 Pages; Columbus, Ohio.
2011 Model Year RZR XP 900, Model No. R11JH87AA; Correspondence from E. Groen; Dec. 17, 2014.
Polaris; Parts and Manufacturers Catalog; Dec. 2012 (p. 93).
Polaris; Screenshots of Online Parts Catalog; Oct. 2011.
Knfilters; 2011, 2012, 2013 Polaris Ranger RZR XP900 Air Intake Installation; Youtube; May 7, 2014 (https://www.youtube.com/watch?v=KkpFAA8nOBU).
Groen, Eric; Re: U.S. Appl. No. 13/775,133; Correspondence to Arctic Cat, Inc. dated Aug. 24, 2015.
Decision of Appeal Opinion and Judgement of U.S. Pat. No. 8,596,405, IPR2014-01427, IPR2014-01428., dated Feb. 9, 2018, 35 pages.
1400HP Buckshop Racing Sand Car Build—Member Rides and Builds; dated May 4, 2016; pp. 74.
1994 Honda FI400R Pilot Service Manual; dated Nov. 1988; pp. 265.
1995 Acura NSX Service Manual; dated 1995; pp. 29.
Request for Ex Parte reexamination; dated Jul. 18, 2017; pp. 151.
Hart's Hunter Article; Dated: Dec. 1998; pp. 5.
Polaris Ranger Service Manual; Dated: 2008; pp. 3 Parts; 1 of 3 100 pages; 2 of 3 100 pages; 3 of 3 128 Pages.
"Hart's Hunter," Dirt Wheels Magazine, Dec. 1998; pp. 69-71 and 74; 4 pages.
"2006 Arctic Cat Accessories," Brochure, Arctic Cat, 69 pages.
"2008 Work/Play: Only Ranger," Brochure, Polaris Sales, Inc., 28 pages.

(56) References Cited

OTHER PUBLICATIONS

"Lancia's Supercar: Delta Force," Motor, Nov. 15, 1986, 171(4382):10-17, 20 total pages submitted.
"Redline's Rockin' Riot: 2009 Redline Riot 750 Test drive" UTV Off-Road Magazine, Feb./Mar. 2009, 4(1):21-24.
"Ridge Runner of Idaho Ltd., Co., Introductory Offer $13,950," Brochure, Ridge Runner of Idaho Ltd., Co., 2 pages.
08 UTV Service Manual: Prowler, Prowler XT, Prowler, Arctic Cat Inc., XTX, Mar. 2008, 178 pages.
1985 Odyssey 350 Service Manual, American Hondo Motor Co., Inc., 1984, 6 pages.
2007 Ranger 500 2x4/4x4/4x4 EFI: Service Manual, PN 9920851, Polaris Sales Inc., 2006, 362 pages.
2008 Ranger 700 4x4 XP/4x4 CREW/6x6 Service Manual, PN 9921277, Polaris Sales Inc., 2007, 368 pages.
2008 Ranger RZR Owner's Manual, Polaris Sales Inc., 2007, 146 pages.
2008 Ranger RZR: Service Manual, PN 9921278, Polaris Sales Inc., 2007, 328 pages.
AmericanSandAssociation.org [online]. "2007 Revenge Racing Silencer Mid Engine 600HP LS2, 54," Mar. 17, 2008, [retrieved on Jan. 29, 2015]. Retrieved from the Internet: URL<https://americansandassociation.org/phpBB3/viewtopic.php?f=34&t=24139&hillt=2007+Revenge+Racing+Silencer+Mid+Engine+600HP+LS2%2C+54>. 4 pages.
Arcticcatpartshouse.com [online], "2006 Arctic Cat Prowler XT 650 H1 Automatic 4x4 Cat Green (U2006P2S4BUSZ) Rear Suspension Assembly," [Retrieved on 19 May 22, 2017]: URL <http://www.arcticcatpartshouse.com/oemparts/a/arc/54f47e2787a865190000e251/rear-suspension-assembly>. 3 pages.
Arcticpartshouse.com [online], "2006 Arctic Cat Prowler XT 650 H1 Automatic 4x4 Cat Green (U2006P2S4BUSZ) Sway Bar Assembly," [Retrieved on 19 May 22, 2017]: URL <http://www.arcticcatpartshouse.com/oemparts/a/arc/54f47e6687a865190000e26f/sway-bar-assembly>. 2 pages.
Arens, "Oh what fun it is to ride a Ridge Runner," ATV Illustrated, Apr. 16-20, 2005, 92 pages provided.
Atvconnection.com [online] Sedorchuk, "New for 2004, Yamaha Rhino 660 4x4!," ATV Connection Magazine, Available from Internet via Internet Archive Wayback machine: URL http://atvconnection.com>. 4 pages.
ATVSource.com [online], "Ridge Runner of Idaho Introduces New Two Seat Rough Terrain Vehicle (RTV)," May 17, 2004. Retrieved from the Internet: URL <http://www.atvsource.com/articles/press_release/2004/051904_ridge_runner_new_two_seat_rtv.htm>. 1 page.
Automotive Handbook, 1st English Ed., Robert Bosch GmbH, 1976, pp. 256-257, and 300-301; 4 pages submitted.
Automotive Handbook, 3rd Ed., Robert Bosch GmbH, 1993, p. 4; 4 pages submitted.
Caranddriver.com [online], "1965 Porsche 911," Oct. 2013, Retrieved from Internet Archive Wayback machine, from Nov. 28, 2013; URL <http://www.caranddriver.com/reviews/1965-porsche-911-archived-road-test-review>. 8 pages.
Casucci, "Lancia 037—Delta S4—Delta 4WD," Editorial, Libreria dell'Automobile, Giovanna Mazzocchi Bordone, 1987, 121 pages.
Classics.honestjohn.co.uk [online], "Porsche 911 (1974-1989)," Last updated Apr. 3, 2013, [retrieved on May 22, 2017]. Retrieved from the Internet: URL <https://classics.honestjohn.co.uk/reviews/porsche/911-1974-1989/>. 3 pages.
Databikes.com [online], "2006 Arctic Cat Prowler TX 650 H1 4x4 ATV Quad," Apr. 23, 2011, [retrieved on May 22, 2017]: URL <http://databikes.com/infophoto/arctic_cat/prowler_xt_650_h1_4x4-2006.html>.
Drakart.com [online], "Drakart Extreme," Retrieved from Internet Archive Wayback machine, from Dec. 27, 2002 [retrieved on May 12, 2015]: URL <http://drakart.com/english/extreme.html>. 3 pages.
Drakart.com [online], "Drakart Formula Cross," Retrieved from Internet Archive Wayback machine, from Feb. 9, 2003 [retrieved on May 12, 2015]: URL <http://drakart.com/english/FormulaCross.html>. 3 pages.

Drakart.com [online], "Drakart Two Seater," Retrieved from Internet Archive Wayback machine, from Dec. 4, 2002 [retrieved on May 12, 2015]: URL <http://drakart.com/english/twoseat.htm>. 1 page.
Drakart.com [online], "Drakart: Manufacturer of off road vehicles for racing, sport, and leisure," Retrieved from Internet Archive Wayback machine, from Dec. 4, 2002 [retrieved on May 12, 2015]: URL <http://drakart.com/english/english.htm>. 2 pages.
Drakart.com [online], "Extreme Off-Road Vehicle," Retrieved from Internet Archive Wayback machine, from Feb. 21, 2003 [retrieved on May 12, 2015]: URL <http:/drakart.com/English/drakartdirt.html>. 4 pages.
Drakart.com [online], "Tornado by Drakart" Retrieved from Internet Archive Wayback machine, from Sep. 22, 2006 [retrieved on May 12, 2015]: URL < http://drakart.com/tornado.html>. 3 pages.
Duffy et al., Auto Drive Trains Technology: Principles, Diagnosis, and Service for all major types of Drive Trains, Chapter 1, The Goodheart-Willcox Company, Inc., Tinley Park, Illionois, Dec. 18, 1995, 25 pages.
Dumontduneriders.com [online]. "SOLD: 07 Revenge Racing Silencer," Dec. 26, 2010, [retrieved on Jan. 29, 2015]. Retrieved from the Internet: URL<http://www.dumontduneriders.com/invision/?showtopic=15655>. 5 pages.
Gator Utility Vehicles, John Deere, Jan. 2012, 34 pages.
Glamisdunes.com [online]. "My New Revenge Silencer," Feb. 22, 2007, [retrieved on Jan. 29, 2015]. Retrieved from the Internet: URL <http://www.glamisdunes.com/invision/index. php?showtopic=101 . . . >. 66 pages.
Hogg & Weeks, The Illustrated Encyclopedia of Military Vehicles, New Burlington Books, 1980, p. 63, 207, 307-08; 6 total pages submitted.
Honda Owner's Manual: 89 FL400R Pilot, Honda Motor Co., LTD, 1988, 98 pages.
Honda Service Manual 1995-2003: TRX400FW FOURTRAX Foreman 400, Honda Motor Co., LTD. Service Publication Office, 370 pages.
Honda Service Manual: 86-87 TRX350 Fourtrax, 87-89 TRX35OD Foreman, Hona Motor Co., LTD, 303 pages.
Honda Service Manual: 89 FL400R Pilot, Honda Motor Co., LTD, 1988, 154,265 pages.
Honda Shop Manual FL350R Odyssey 350, Honda Motor Co., Ltd., 1985, 209 pages.
Kirsten, "Sand Styling," Dune Buggies and Hot VWs, Oct. 2004, 7 pages.
Kymco UXV500 Owner's Manual, May 2008, 88 pages.
Lancia Delta S4 Parts Catalogue, Fiat Auto Soc P. AZ., 1985-1986, 237 pages.
Legg & Mead, Peugeot 205 Service and Repair Manual, Haynes Publishing, 1996, 249 pages.
Lelong, Peugeot 205 Turbo 16: Les Lauriers de Sochaux, ETAI Eds Techniques Pour L'automobile Et L'industrie, 2011, 162 pages.
Mavrigian, "Tuning' up the chassis: suspension enhancements have moved beyond the 'street rodders.' Today, pickups, SUVs, and even luxury cars are getting into the act," Motor Age, Dec. 1, 2002, vol. 121, issue 12, 7 pages.
Mike Burton, Svsm.org [online], "XR311 Experimental Attack Vehicle," [retrieved on Feb. 26, 2014]. Retrieved from the Internet: URL <svsm.org/gallery/xr311>. 16 pages.
Off-Road.com [online], "First Ridge Runner Rally Dubbed A Pinnacle Success," Jul. 1, 2005. Retrieved from the Internet: URL<http://www.avtsource.com/articles/press-releases/2005/071405_1st_ridge_runner_rally_a_success.htm>. 1 page.
Off-Road.com [online], "Ridge Runner Rugged Terrain Vehicle Introduces 2005 Model with New Options," Dec. 31, 2004. Retrieved from the Internet: URL<http://www.off-road.com/atv/feature/ridge-runner-rugged-terrain-vehicle-introduces-2005-model-with-new-options-30643.html>. 2 pages.
Off-road.com [online]. "Revenge Racing 2-Seat Silencer!" Dec. 1, 2006, [retrieved on Jan. 29, 2015]. Retrieved from the Internet: URL<http://www.off-road.com/atv/project1521.html>. 3 pages.

* cited by examiner

OFF-HIGHWAY RECREATIONAL VEHICLE

PRIORITY CLAIM

The present application is a continuation of U.S. application Ser. No. 15/684,863, entitled OFF-HIGHWAY RECREATIONAL VEHICLE, filed Aug. 23, 2017; which is a continuation of U.S. application Ser. No. 15/143,353, entitled OFF-HIGHWAY RECREATIONAL VEHICLE, filed Apr. 29, 2016 and issued as U.S. Pat. No. 9,771,112 on Sep. 26, 2017; which is a divisional of U.S. application Ser. No. 13/775,133, entitled OFF-HIGHWAY RECREATIONAL VEHICLE, filed Feb. 23, 2013 and issued as U.S. Pat. No. 9,327,587 on May 3, 2016; which is a continuation-in-part of U.S. application Ser. No. 13/485,696, entitled VEHICLE CONFIGURATION, filed May 31, 2012 and issued as U.S. Pat. No. 9,180,801 on Nov. 10, 2015. All contents of which are hereby incorporated by reference.

FIELD OF THE INVENTION

This invention relates generally to a vehicle configuration in which the center of gravity of the vehicle is near the center of gravity of the driver and passenger in at least the longitudinal and vertical directions to minimize the impact of vehicle movement on the occupants.

BACKGROUND OF THE INVENTION

Recreational off-highway vehicles ("ROVs") are meant to travel over rough terrain, in various conditions and at a variety of speeds. Such vehicles have substantial under-body clearance to avoid off-road obstacles. The driver also needs to have a good view of the ground to maneuver over and around obstacles. However, these aspects of driving off-road vehicles may result in a vehicle that seats the driver and passenger high in the vehicle, and high above the ground. When the vehicle moves over uneven terrain, the vehicle can rock or sway and cause the driver and passengers to also rock and sway to an even larger degree. Excessive rocking and swaying can be uncomfortable for the driver and passenger, and can even affect the driver's ability to control the vehicle. There is a need for a vehicle that allows a smoother ride over uneven terrain and aids the driver in maintaining control.

SUMMARY OF THE INVENTION

In at least one embodiment, the present disclosure is directed to a recreational off-highway vehicle ("ROV") having a front axle, a rear axle, two side-by-side seats, an engine, and a transmission. The engine and transmission are positioned within the vehicle such that a weight distribution of the vehicle is between 35-45% on the front axle and between 65-55% on the rear axle. The ROV also includes at least one seat for a passenger. The front and rear axles, the engine, the transmission, and the seat are positioned relative to one another such that the vehicle's center of mass is at approximately the same longitudinal position as the driver's and passenger's centers of mass when they are seated in the vehicle, and the vehicle's center of mass is as high or nearly as high vertically as the occupants' center of mass. Hereinafter, reference to "passenger" will generally apply to driver and passenger(s) alike.

In other embodiments, the present disclosure is directed to a vehicle having a center of mass. The vehicle includes a front axle, a rear axle. The weight of the vehicle is distributed between the rear axle and front axle at a ratio of approximately 60/40, respectively, or other distributions such as 65-55/35-45 or other suitable ratios. The vehicle also includes a driver seat, and a passenger seat positioned at an approximate same vertical and longitudinal position as the driver seat. The driver and passenger seats are both positioned such that an occupant in either the driver or passenger seats is positioned with his/her center of mass substantially at a same vertical position as the vehicle's center of mass.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

Figure 1:
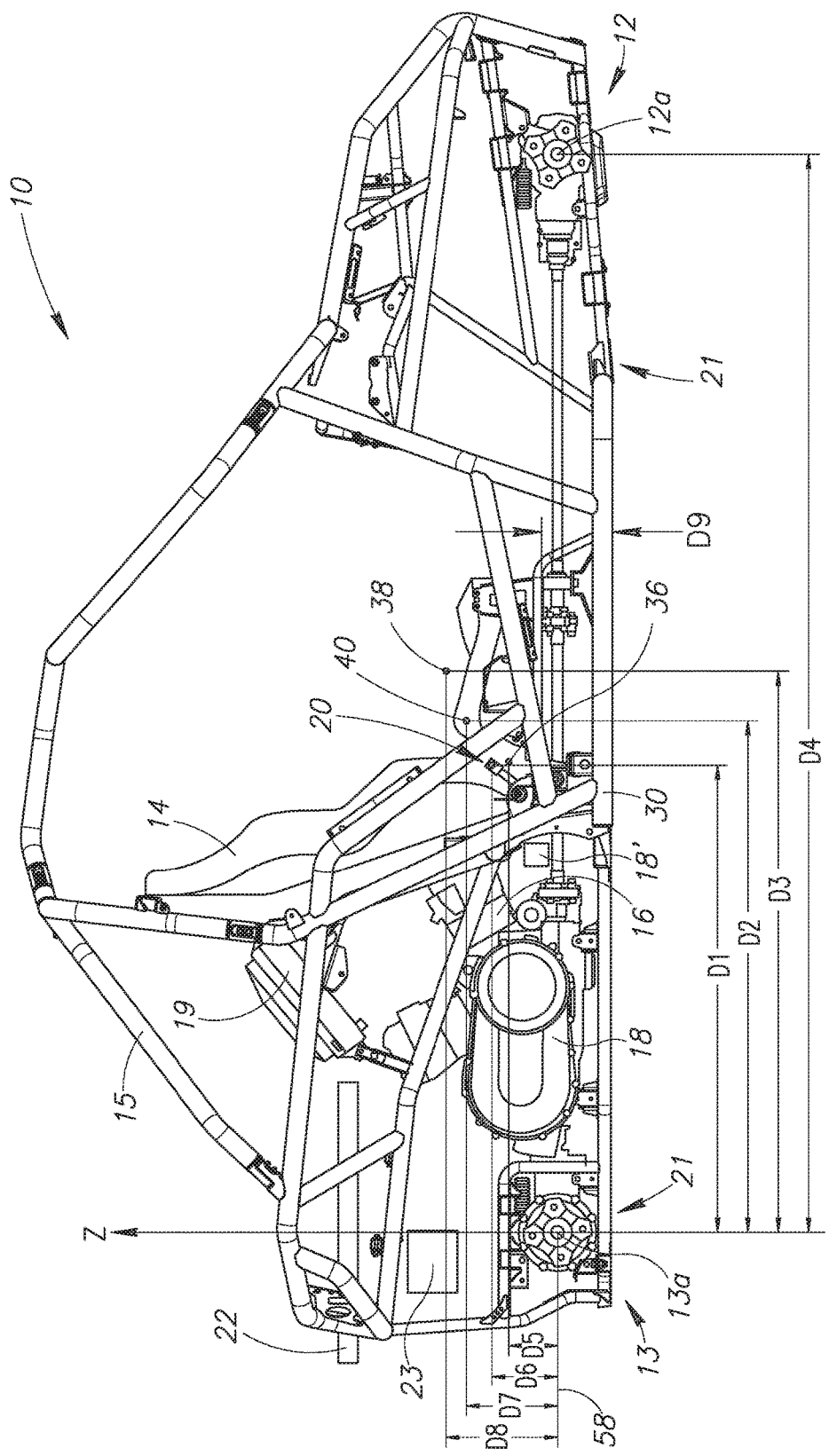
FIG. 1 is a schematic side view of a vehicle having a center of mass at least approximately superimposed in at least the longitudinal and vertical directions with the center of mass of the passenger according to embodiments of the present invention.

The present disclosure is generally directed to a vehicle configured such that the center of gravity of the vehicle is very near the center of gravity of the passenger. In one preferred embodiment, the longitudinal center of gravity of the passenger is between the midpoint between the axles and the center of gravity of the vehicle. In some embodiments, the passenger's center of gravity is assumed to be generally at a certain point relative to the passenger. For example, the center of gravity can be assumed to be at the passenger's hip, or at a point near the navel as the passenger sits in the vehicle. The center of gravity can be positioned outside of the passenger's physical body. The center of gravity may change depending on the configuration of the seats and the passenger's posture within the vehicle. The vehicle's center of gravity can be at the same vertical, longitudinal, and lateral position as the passenger's center of gravity. For vehicles having side-by-side seating, the center of gravity of the vehicle is generally aligned with the centerline of the vehicle, and accordingly is placed between the driver and passenger seats. In some embodiments, the vehicle's center of gravity is higher than the passenger's center of gravity. In other embodiments, the vehicle's center of gravity is slightly lower than the passenger's center of gravity. Further details of the present disclosure are given in more detail with reference to FIG. 1 below.

The vehicle's center of gravity (or "center of mass") can be aligned with the passenger's spine at a low position of the spine, such as near the passenger's tailbone. The forces imparted to the passenger by the vehicle will therefore be perceptibly minimized. In some embodiments, the wheel vehicle's center of gravity is rearward of the midpoint of the wheelbase. For example, the center of the wheelbase can be generally near the longitudinal midpoint of the vehicle (equidistant between the front and rear extremes of the vehicle), and the vehicle center of mass is preferably at a longitudinal position 60% from the effective front axle of the vehicle and 40% from the effective rear axle of the vehicle (i.e. 60/40 weight distribution). The seats can be positioned with the passenger's center of mass somewhere longitudinally between these two points. As the vehicle moves over varied terrain, bumps in the road cause the vehicle to move about these two points as a function of the suspension. In an example, if the vehicle had a perfectly rigid suspension, movement over varied terrain would cause the vehicle to move about the midpoint of the wheelbase. Conversely, if a vehicle with a perfectly elastic suspension traveled over the same varied terrain, the vehicle would move about the center of mass. Since neither of these theoretical extremes can be achieved, the realistic vehicle with some suspension will move about a point somewhere between these two points. Positioning the passenger's center of mass within this envelope causes the perceived motion of the vehicle to be less. Positioning the passenger within this longitudinal envelope provides the smoothest ride to the passenger for a given suspension configuration. The smoothest ride allows the passenger to maintain the best control of the vehicle under speed and uneven terrain. Thus, ideally, if the longitudinal weight distribution of the vehicle places the center of gravity of the vehicle 40% from the effective rear axle, the longitudinal center of gravity of the passenger is placed between 40% and 50% distant from the rear axle.

FIG. 1 is a schematic illustration of a vehicle 10 configured according to embodiments of the present disclosure. The vehicle 10 can be a four-wheeled vehicle having two front wheels 12 on a front axle 12a, two rear wheels 13 on a rear axle 13a, two seats 14: a driver's seat and a passenger's seat. The vehicle 10 can be an all-terrain vehicle ("ATV") or a recreational off-highway vehicle ("ROV"), a two- or three-wheeled vehicle, or any other suitable type of wheeled vehicle.

The vehicle can have any suitable drive train, such as 4×4, 2×4, etc. The vehicle 10 can be made of a frame and a roll cage 15 that generally encloses the passenger area and protects the passengers in case of a roll-over or other circumstance. The vehicle 10 can have a spider frame construction. In some embodiments, the vehicle 10 has doors (not shown) to the passenger area that extend downward to the lower portion of the seat 14 or lower such as below the seat 14. The vehicle 10 preferably includes a radiator 19 positioned rearward of the seats 14 and above the engine. The vehicle 10 can have a suspension system 21 that can be a trailing-arm suspension, an A-link suspension, or any other suitable type of suspension system 21. The vehicle 10 can include a cargo bed 22 at a rear position or at another position such as near the front of the vehicle 10 or laterally outside the passenger area or above the passenger area. The vehicle 10 can include a fuel tank 23 which can be positioned rearward of the engine 16, above or rearward of the transmission 18 and engine 16, or elsewhere. The vehicle 10 can also include other common vehicle components, such as a battery, a spare tire, tire changing equipment such as a jack, and other such vehicle components.

The vehicle 10 has an engine 16, a transmission 18, and other standard vehicle equipment positioned variously throughout the vehicle 10. The transmission 18 can be positioned rearward of the engine 16, or forward of the engine as shown by 18'. In other embodiments, the engine 16 and transmission 18 can be at a same lateral or longitudinal position. The transmission 18 can be a continuously variable transmission (CVT), or another suitable type of transmission. The transmission 18 can have a drive clutch and a driven clutch. In some embodiments, the drive clutch is forward of the driven clutch; in others, the driven clutch is forward of the drive clutch.

Any of these vehicle components can be positioned to achieve a desired weight distribution for the vehicle 10. The vehicle 10 therefore has a center of gravity or center of mass ("COM") 30 at a certain point in the vehicle 10. A COM is generally defined as the mean location of all the mass in a system. In certain embodiments, the seats 14 are positioned within the vehicle 10 such that the passenger's COM 20 is superimposed on the COM 30 of the vehicle 10 in at least the longitudinal and vertical directions. In some embodiments, the vehicle's COM 30 and the passenger's COM 20 are exactly superimposed in one or more of the longitudinal and vertical directions. The vehicle's COM 30 can also be superimposed with the passenger's COM 20 in the lateral direction. In other embodiments, there is some distance between the vehicle's COM 30 and the passenger's COM 20. This distance is referred to herein as the center-center distance. In some embodiments, the passenger's COM 20 is assumed to be near an appropriate portion of the passenger's body, such as the hip area or the navel. In some embodiments, the vehicle 10 can be configured such that the vehicle's COM 30 is aligned or nearly aligned with the passenger's spine. Minimizing the distance between the vehicle COM 30 and the passenger's spine can improve the passenger ride in the vehicle 10. Of course, passengers have different body types with different center of mass positions; however, there are several approximations for passenger COM that are used in the industry. For example, a Seat Index Point ("SIP") 40 is generally used by seatbelt manufacturers to approximate the position of the passenger when seated in the seat 14. The SIP can be measured according to SAE Standard No. J1163 200612, published Dec. 4, 2006. Another point is the ANSI point 38 that is defined by the ANSI/ROHVA 1-201X standard as approximately 152 mm above the lowest point 36 of the occupant-supporting surface, and 254 mm forward of the seat back. In other literature, the ANSI point can be defined as being in line with a vertical transverse plane of the vehicle approximately equidistant between the front and rear axle. In some particular embodiments, the vertical transverse plane can be 0.05% closer to one axle than to another. In other words, the ratio between the distance between the vertical transverse plane and an axle (either the front or the rear) and the wheelbase is approximately 49.55%. In several embodiments of the invention, the passenger COM 20 can be approximated by any one of these reference points alone, or any two or more in combination. For example, the passenger COM 20 can be approximated by an arithmetic average of the SIP 40 and the ANSI point 38, or any other suitable combination.

The vehicle 10 can have an equal weight distribution between the front axle 12a and the rear axle 13a. In other embodiments, the vehicle weight distribution can be uneven, favoring the front or rear axles 12a, 13a. In one particular preferred embodiment, the weight distribution is a 40/60 front/rear distribution, with approximately 40% of the vehicle weight bearing on the front wheels 12, and 60% of the vehicle weight bearing on the rear wheels 13. In other words, a distance D1 between the vehicle COM 30 and the rear axle 13a is approximately 40% of a distance D4 between the front axle 12a and the rear axle 13a.

The distance D1, between the vehicle COM 30 and the rear axle 13a is approximately 982.9 mm in the longitudinal direction, and the distance D4 between the front axle 12a and the rear axle 13a is approximately 2413.6 mm in the longitudinal direction. For purposes of description, a generally horizontal plane 58 parallel with and running through the front axle 12a and the rear axle 13a is used for reference. The vehicle COM 30 can be spaced apart from the plane 58 by a distance D6, which can be approximately 274.4 mm in the vertical direction. In some embodiments, the SIP 40 can be spaced apart from the rear axle 13a by a distance D2 in the longitudinal direction, and from the plane 58 by a distance D7 in the vertical direction. Distances D2 and D7 can be 1091.5 mm and 332.3 mm, respectively. In several embodiments, the ANSI point 38 can be spaced apart from the rear axle 13a by a distance D3 in the longitudinal direction, and from the plane 58 by a distance D8 in the vertical direction. Distances D3 and D8 can be 1196 mm and 373.9 mm, respectively.

The position of the engine 16 and transmission 18, and any other vehicle components, can be varied in any suitable manner to achieve the desired relationship between the vehicle COM 30 and the passenger COM 20. The engine 16 and transmission 18 can be positioned behind the seat 14, and more specifically, with the transmission 18 positioned behind the engine 16. In certain embodiments, the engine 16 and transmission are at approximately the same vertical level relative to the vehicle 10. The vehicle 10 can include a radiator 19 which can be positioned above the engine and/or transmission as shown. The radiator 19 can be angled rearwardly to intake air from above and rearward of the radiator 19 and direct it toward the engine 16 and other internal components. The position of the radiator 19 can be varied to achieve a desired vehicle COM 30. To keep the COM biased somewhat rewardly as desired for off-road vehicles, the radiator is placed behind the longitudinal center of the vehicle. Various other configurations are possible to achieve the desired weight distribution.

The front axle 12a and the rear axle 13a can be positioned relative to the vehicle 10 such that the midpoint between them is spaced apart longitudinally from the vehicle COM 30 by a certain distance. For example, assuming D3 is the distance between the rear axle 13a and the midpoint of the wheelbase and D1 is the distance between the rear axle 13a and the vehicle COM 30, the distance D2 defines a longitudinal envelope between these two points. In other embodiments the midpoint of the wheelbase can be rearward of the vehicle COM 30. In preferred embodiments, the passenger's COM 20 is positioned somewhere between these two points D1 and D3. As the vehicle moves over varied terrain, bumps in the road cause the vehicle 10 to move about these two points as a function of the suspension. In an example, if the vehicle 10 had a perfectly rigid suspension, movement over varied terrain would cause the vehicle 10 to tend to move about the midpoint of the wheelbase. Conversely, if a vehicle with a perfectly elastic suspension traveled over the same varied terrain, the vehicle 10 would tend to move about the center of mass. Since neither of these theoretical extremes can be achieved, the realistic vehicle with some suspension will effectively move about a point somewhere between these two points. Positioning the passenger's center of mass within this envelope causes the perceived motion of the vehicle to be less and therefore passenger comfort is improved.

Figure 2:
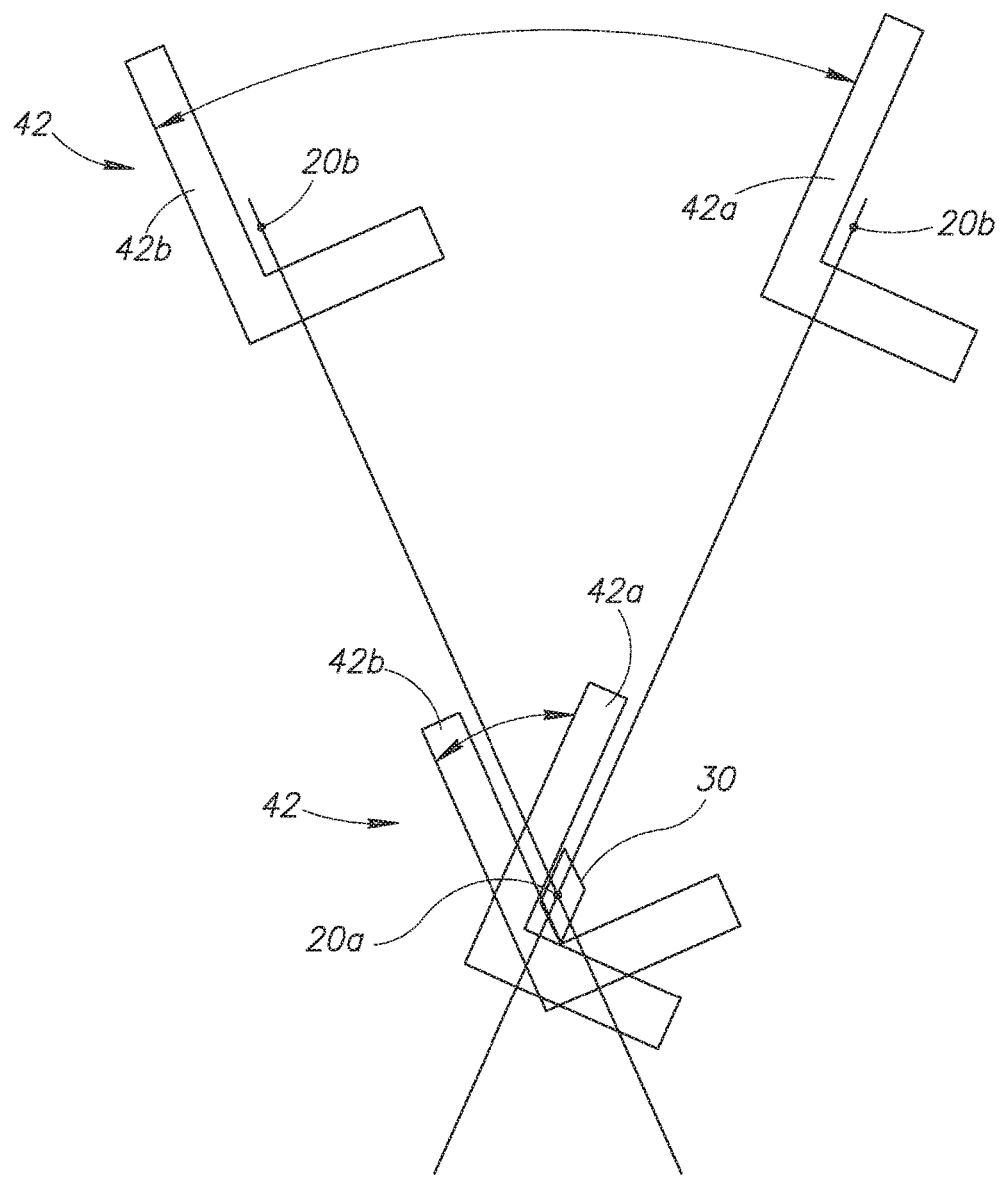
FIG. 2 is a schematic view of a seat of the vehicle of FIG. 1 according to embodiments of the present invention.

FIG. 2 is a schematic illustration of a vehicle and seat configuration according to embodiments of the present disclosure that shows the effects of a small or large center-center distance on the ride of the vehicle 10. The center-center distance can have a lateral component, a vertical component, and a longitudinal component. When the vehicle's COM 30 and the passenger's COM 20 are at the exact same position, the center-center distance is zero. The larger the center-center distance is, the more an uneven terrain impacts the passenger's ride. For example, if the center-center distance has a large vertical component (because the vehicle's COM is higher or lower than the passenger's COM—the typical case) or a large longitudinal component (because the vehicle's COM is farther forward or back than the passenger's COM), movement of the vehicle about the lateral axis (pitch) moves the passenger as a function of center-center distance. FIG. 2 shows a first seat 42 with a COM 20 aligned with a vehicle's COM 30. In this example, at least the vertical and longitudinal components of the center-center distance are zero. As the seat 42 rocks back and forth about the lateral axis, or pitch axis, such as when the vehicle 10 goes over a bump, the passenger in the seat 42 moves between a first position 42a and a second position 42b. The movement of the passenger in the seat 42 is minimal. The second seat 42 is shown with an exaggerated vertical center-center distance. With the same vehicle movement, the passenger in the second seat 42 moves a great deal more between a first position 42a and a second position 42b. The perceived movement of the passenger is approximately linearly related to the center-center distance about any given axis. If the center-center distance has a large longitudinal or lateral component, the passenger will feel the movement more when the vehicle 10 rotates about the vertical axis, or yaw axis; if the center-center distance has a large lateral or vertical component, the passenger will feel the movement more when the vehicle rotates about the longitudinal axis. The vehicle configuration of the present disclosure minimizes the center-center distance and thereby improves the ride of the vehicle 10. Thus, positioning the passenger vertically close to the COM and between D1 and D3 of the vehicle improves the ride quality perceived by the passenger.

It should be noted that when the passenger sits in the vehicle the suspension is becomes slightly more compressed, thus lowering the vehicle slightly and, depending on the suspension arms, widening the vehicle track. Because of this configuration, the stability of the vehicle improves when there are passengers seated in the vehicle 10.

In some embodiments, the center-center distance in the longitudinal and vertical direction is zero or nearly zero. In other words, the vehicle's COM 30 is at the same longitudinal position and vertical position as the passenger's COM 20. The vehicle's COM 30 can be at a lateral midpoint of the vehicle 10, and the seats 14 can be equally spaced from the midline of the vehicle. Assuming two side-by-side passengers have equal weight, in this configuration the vehicle's COM 30 and the passenger's collective COM 20 are at the same point longitudinally, vertically, and laterally. In some embodiments, the vehicle 10 can have a single, center-mounted seat in which case the driver's COM 20 can be exactly or nearly exactly superimposed upon the vehicle's COM 30. In many other configurations, however, there is some center-center distance in at least one dimension. In some embodiments, the passenger's COM 20 is less than approximately 100 cm from the vehicle's COM 30 in the longitudinal or vertical direction. In other embodiments, the center-center distance can be greater, such as between 100-400. In some embodiments the passenger's COM 20 is above or below the vehicle's COM 30 or in front of or behind the vehicle's COM 30 or any workable combination thereof (e.g. above and behind, below and in front of, etc). As previously noted the passenger COM is preferably slightly forward of the vehicle COM 30 in a vehicle with a heavier weight distribution on the rear axle.

In some embodiments, the seats 14 of the vehicle 10 are constructed and positioned so that the passenger's COM 20 is closer vertically to the vehicle's COM 30 the than conventional ROVs or other vehicles. Conventional side-by-side off-road recreational vehicles have seats that are positioned so that the passenger's COM is over 20 cm higher than the vehicle's COM, causing the passenger to undesirably move forward and backward as the vehicle rocks about a lateral axis.

In contrast to some conventional vehicles, the center-center distance of the present disclosure can be small even though the bottom of the seat 14 is spaced apart from the bottom of the vehicle 10 by a distance D9. Some vehicles, such as some sandrails, are configured with the bottom of the seat very near to the bottom (or floor) of the vehicle. Conventional recreational off-road vehicles have a seating area more than 10 cm (typically 12.5 cm) higher than D9 above the bottom of the vehicle chassis.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. An off-road vehicle comprising:
   a frame, a roll cage, and a passenger area;
   at least one seat located within the passenger area;
   an engine, the engine positioned rearwardly of the passenger area;
   a continuously variable transmission operatively connected to the engine;
   a front axle and a rear axle, the front and rear axles being operatively coupled to the engine via the continuously variable transmission, wherein the front axle is positioned forwardly of the passenger area and the rear axle is positioned rearwardly of the passenger area; and
   a radiator positioned rearwardly of the at least one seat, wherein at least a portion of the radiator is above at least a portion of the continuously variable transmission and wherein the radiator is titled such that a top of the radiator is positioned forwardly of a bottom of the radiator.

2. The off-road vehicle of claim 1, wherein the at least a portion of the radiator is positioned above at least a portion of the engine.

3. The off-road vehicle of claim 1, further comprising a cargo-carrying portion, at least a portion of the cargo carrying portion positioned above the bottom of the radiator.

4. The off-road vehicle of claim 3, wherein the at least one seat has a seatback; a portion of the seatback extending above the top of the radiator and a portion of the seatback extending below the bottom of the radiator.

5. The off-road vehicle of claim 4, wherein a portion of the engine extends in front of the front of the radiator.

6. The off-road vehicle of claim 5, further comprising doors.

7. The off-road vehicle of claim 6, wherein the cargo-carrying portion is a cargo bed and the cargo bed is positioned rearwardly of the passenger area.

8. The off-road vehicle of claim 7, wherein the frame comprises a longitudinal frame member extending rearwardly of the passenger area, a top of the radiator being above the top of the frame member and a bottom of the radiator being below the bottom of the frame member.

9. The off-road vehicle of claim 8, having a weight distribution of between 35% to 45% front and 55% to 65% rear.

10. The off-road vehicle of claim 8, wherein the vehicle has a center of gravity and the passenger has a center of gravity when seated in the vehicle, the center of gravity of the vehicle being above the center of gravity of the passenger when seated in the vehicle.

11. The off-road vehicle of claim 8, wherein the vehicle has a center of gravity and the passenger has a center of gravity when seated in the vehicle, the center of gravity of the vehicle being below the center of gravity of the passenger when seated in the vehicle.

12. The off-road vehicle of claim 8, wherein at least a portion of the cargo-carrying portion extends over a rear gearcase.

13. An off-road vehicle comprising:
    a frame, a roll cage, and a passenger area;
    at least one seat located within the passenger area;
    an engine, the engine positioned rearwardly of the passenger area;
    a continuously variable transmission operatively connected to the engine;
    a front axle and a rear axle, the front and rear axles being operatively coupled to the engine via the continuously variable transmission, wherein the front axle is positioned forwardly of the passenger area and the rear axle is positioned rearwardly of the passenger area;
    a radiator positioned rearwardly of the at least one seat, wherein at least a portion of the radiator is above at least a portion of the continuously variable transmission and wherein the radiator is angled rearwardly from top to bottom, the top being closer to the seat than the bottom; and
    a cargo-carrying portion positioned rearwardly of the passenger area, at least a portion of the cargo carrying portion positioned above the bottom of the radiator.

14. The off-road vehicle of claim 13, wherein the radiator intakes air form above and rearward and directs air generally toward the engine.

15. An off-road vehicle comprising:
    a frame and a passenger area, the passenger area having at least one seat with a seat back;
    an engine positioned rearwardly of the passenger area;
    a continuously variable transmission operatively connected to the engine on a side thereof;
    a front axle and a rear axle, the front and rear axles being operatively coupled to the engine via the continuously variable transmission, wherein the front axle is positioned forwardly of the passenger area and the rear axle is positioned rearwardly of the passenger area;
    a radiator positioned rearwardly of the at least one seat and directly above at least a portion of the engine, the radiator being angled to direct air towards the engine, wherein the radiator is positioned above a center of gravity of the vehicle and behind a longitudinal center of the vehicle, and wherein the seat bottom is positioned below a center of gravity of the vehicle; and
    a cargo area adjacent the radiator.

16. The off-road vehicle of claim 15, wherein the frame includes a frame member extending rearwardly from adjacent the seat back, the radiator having a portion above and a portion below said frame member.

17. An off-road vehicle comprising:
    a frame and a passenger area, the passenger area having at least one seat with a seat back;
    an engine positioned rearwardly of the passenger area;
    a continuously variable transmission operatively connected to the engine on a side thereof;
    a front axle and a rear axle, the front and rear axles being operatively coupled to the engine via the continuously variable transmission, wherein the front axle is positioned forwardly of the passenger area and the rear axle is positioned rearwardly of the passenger area;

a radiator positioned rearwardly of the at least one seat and directly above at least a portion of the engine, the radiator being angled to direct air towards the engine, wherein at least a portion of the radiator is positioned directly above at least a portion of the continuously variable transmission; and a cargo area adjacent the radiator.

* * * * *